(12) United States Patent
Canty et al.

(10) Patent No.: US 6,782,184 B2
(45) Date of Patent: Aug. 24, 2004

(54) MODULAR INSERTION DEVICE FOR PROCESS ILLUMINATION AND VIEWING

(75) Inventors: Thomas M. Canty, Williamsville, NY (US); Michael F. Rizzo, Blasdell, NY (US)

(73) Assignee: J.M. Canty, Inc., Buffalo, NY (US)

( * ) Notice: Subject to any disclaimer, the term of this patent is extended or adjusted under 35 U.S.C. 154(b) by 232 days.

(21) Appl. No.: 10/011,848

(22) Filed: Dec. 4, 2001

(65) Prior Publication Data

US 2003/0103756 A1 Jun. 5, 2003

(51) Int. Cl.$^7$ .................................................. G02B 6/00
(52) U.S. Cl. ........................................ 385/138; 362/574
(58) Field of Search .............................. 385/138, 147; 362/562, 572, 574, 581

(56) References Cited

U.S. PATENT DOCUMENTS

| | | | | |
|---|---|---|---|---|
| 3,114,283 A | * | 12/1963 | Gruner | 355/1 |
| 3,278,739 A | * | 10/1966 | Royka et al. | 362/554 |
| 4,577,110 A | * | 3/1986 | MacBride et al. | 250/461.2 |
| 4,677,473 A | * | 6/1987 | Okamoto et al. | 348/126 |
| 4,729,070 A | * | 3/1988 | Chiu | 362/33 |
| 4,803,365 A | * | 2/1989 | Krause et al. | 250/461.2 |
| 5,143,436 A | * | 9/1992 | Baylor et al. | 362/582 |
| 5,353,786 A | * | 10/1994 | Wilk | 600/249 |
| 5,386,817 A | * | 2/1995 | Jones | 600/104 |
| 5,409,483 A | * | 4/1995 | Campbell et al. | 606/15 |
| 5,562,842 A | * | 10/1996 | Laferriere | 219/121.83 |
| 5,645,336 A | * | 7/1997 | Brown et al. | 362/26 |
| 6,201,892 B1 | * | 3/2001 | Ludlow et al. | 382/149 |
| 6,450,655 B1 | * | 9/2002 | Walck et al. | 362/3 |

* cited by examiner

Primary Examiner—Ellen E. Kim
(74) Attorney, Agent, or Firm—Davidson, Davidson & Kappel, LLC

(57) ABSTRACT

An illumination module comprises a ring-shaped mounting member having an axially extending viewing passage and an L-shaped radiation guide including a radiation entry end for communication with an external radiation source and a radiation exit end provided with a fused glass window for insertion within a process vessel or pipeline. The radiation guide extends through a radial guide hole in the mounting member and bends to run axially along the passage of the mounting member in close proximity to the wall of the passage so as to minimize blockage of available viewing area through the passage. The illumination module can be clamped between a sight glass or camera viewing unit and the flange of a nozzle port, or between segments of a pipeline near a viewing window of the pipeline, to form an illumination and viewing assembly. A coarse flow duct system in the mounting member, and a fine flow duct system in the mounting member and radiation guide, enable delivery of cleaning fluid to a sight glass or camera unit, and to the fused glass window of the radiation guide, respectively.

26 Claims, 4 Drawing Sheets

MODULAR INSERTION DEVICE FOR PROCESS ILLUMINATION AND VIEWING

BACKGROUND OF THE INVENTION

1. Field of the Invention

The present invention relates to devices for observing the interior contents of a vessel or process pipeline, and more particularly to a module for introducing illuminating radiation into the vessel or pipeline in an efficient manner without substantially interfering with the opportunity to view the illuminated contents.

2. Description of the Related Art

It is known to use various devices for direct or remote viewing of the interior of a pressure vessel, reaction vessel, process pipeline, or the like. A simple device for this purpose is a transparent viewing window provided in a wall of the vessel or pipeline. By looking through this window, an operator can observe liquid levels, color changes, and other visually determinable factors taking place within the vessel or pipe. Several of these viewing windows are disclosed, for example, in U.S. Pat. Nos. 2,744,487; 3,299,851; 3,837,226; and 4,245,566. One problem associated with these viewing windows is that a lack of illumination hinders observation of the contents.

To overcome the problem of illumination, Thomas Canty invented a light pipeline device as described in U.S. Pat. No. 4,746,178 for illuminating the interior of a pressure vessel. The device comprises a housing containing a fiber optic rod running straight from an external light source to a fused glass, laminated barrier disc. The unit is securely mounted on the vessel apart from a separate viewing window, with the barrier disc being arranged adjacent the interior of the vessel, whereby source light is transmitted to illuminate the vessel contents. Although this advancement significantly helps with viewing, it requires another separate aperture through the vessel wall for illumination in addition to the aperture provided for viewing. Also, illuminating through the fused glass barrier disc creates unwanted reflections that hinder viewed image quality.

It is also known, as a matter of common practice, to simply position a light source near a viewing window such that both illumination and viewing take place through the same window in the vessel. This approach is less than ideal because the light source blocks a significant portion of the viewing window, leaving only a small portion of the window for viewing, and illumination light is reflected by the viewing window such that it interferes with viewing instead of illuminating the contents of the vessel as intended.

Combination illumination and camera viewing units are known in the prior art, for example from U.S. Pat. No. 5,230,556 to Canty et al. Units of this type include a centrally located camera for automatic viewing through a sight glass and a light guide delivering light through the sight glass adjacent the camera lens for illumination along an axis substantially parallel to the camera lens axis. This arrangement does not allow an on-site operator to look through the sight glass to view interior contents because the sight glass is blocked by the camera and light guide. Moreover, in the apparatus described in the '556 patent, the light guide cannot be inserted beyond the sight glass into the vessel, and illumination energy per unit volume dissipates quickly with distance into the vessel. Consequently, the effectiveness of external illumination units of the prior art is particularly diminished in those situations where the sight glass is positioned on a nozzle entry which extends out from the interior wall surface of the vessel by several inches.

Another problem associated with viewing windows of the prior art is that an internal surface of the viewing window can become clouded or blocked by process constituents coming into contact therewith. This problem is exacerbated where heat from an illumination source causes the internal contents to bake onto the viewing window.

BRIEF SUMMARY OF THE INVENTION

It is therefore an object of the present invention to enable introduction of cool illumination into the process and allow for maximum transmission of illuminating radiation into the interior of the vessel for viewing purposes.

It is another object of the present invention to provide a modular means of cool illumination that can be mounted in combination with a sealed transparent or translucent sight glass without blocking a substantial portion of the sight glass.

It is a further object of the present invention to provide a modular means of cool illumination that can be mounted in combination with a sealed camera unit or other radiation detector unit without blocking a substantial portion of the field of view of the camera.

It is a further object of the present invention to provide a modular illumination device that can be combined with either a sight glass or an automatic viewing unit as desired.

It is a further object of the present invention to provide an insertable means of illumination that will eliminate reflection into the operator's eyes or camera lens, thereby maximizing viewing capacity and accuracy.

It is a further object of the present invention to provide an insertable means of illumination that can be installed at a nozzle port to effectively illuminate process constituents at a location spaced inwardly from the nozzle port.

It is a further object of the present invention to provide an illumination module having means for enabling periodic cleaning of a viewing window adjacent to the illumination module while the process vessel is operational.

It is a further object of the present invention to provide an illumination module having means for enabling periodic cleaning of a radiation exit end of an insertable radiation guide of the module for maintaining a high level of illumination.

It is a further object of the present invention to provide for non-axial illumination of a process for viewing through a separate viewing device.

In furtherance of these and other objects, an illumination module formed in accordance with a preferred embodiment of the present invention generally comprises a ring-shaped mounting member having an axially extending viewing passage therethrough, and an L-shaped radiation guide having a radiation entry end for communication with an external radiation source and a radiation exit end provided with a fused glass window for insertion within a vessel or pipeline containing process constituents. The radiation guide is arranged such that it extends through a radial guide hole in the mounting member and bends to run axially along the passage of the mounting member in close proximity to the wall of the passage so as to leave a majority of the cross-sectional area of the passage unblocked for viewing therethrough.

The illumination module can be clamped between a sight glass or camera viewing unit and the flange of a nozzle port, or between segments of a pipeline near a viewing window of the pipeline, to form an illumination and viewing assembly.

In a preferred embodiment, the mounting member includes a coarse flow duct system for enabling delivery of cleaning fluid to a sight glass or camera unit mounted adjacent thereto, and the mounting member shares a fine flow duct system with an outer housing of the radiation guide for enabling delivery of cleaning fluid to the fused glass window at the radiation exit end of the guide.

The illumination module of the present invention, and the preferred features thereof, can be used separately or in any combination with other modular accessories beyond a sight glass or camera viewing unit.

BRIEF DESCRIPTION OF THE DRAWINGS

The nature and mode of operation of the present invention will now be more fully described in the following detailed description of the preferred embodiment taken with the accompanying drawing figures, in which.

DETAILED DESCRIPTION OF THE INVENTION

For purposes of describing and claiming the present invention, the term "radiation guide" is intended to encompass, without limitation, any device used to constrain or guide radiation along a defined path without significant energy loss, including optical wave guides, light pipes, fiber optic bundles, and the like. Also for purposes of describing and claiming the present invention, the term "radiation detector" is intended to encompass, without limitation, any device used to sense radiated energy, including photosensitive elements and arrays responding to infra-red light, visible light, and ultra-violet light; ultrasound imaging devices; radar sensors; and nuclear radiation sensors. The term "illuminate," as used herein in its various forms, refers to application of radiation in any form, as opposed to just light, to a subject. Similarly, the term "view," as used herein in its various forms, refers to detection of radiation generally, and is not limited to detection of light.

Figure 1:
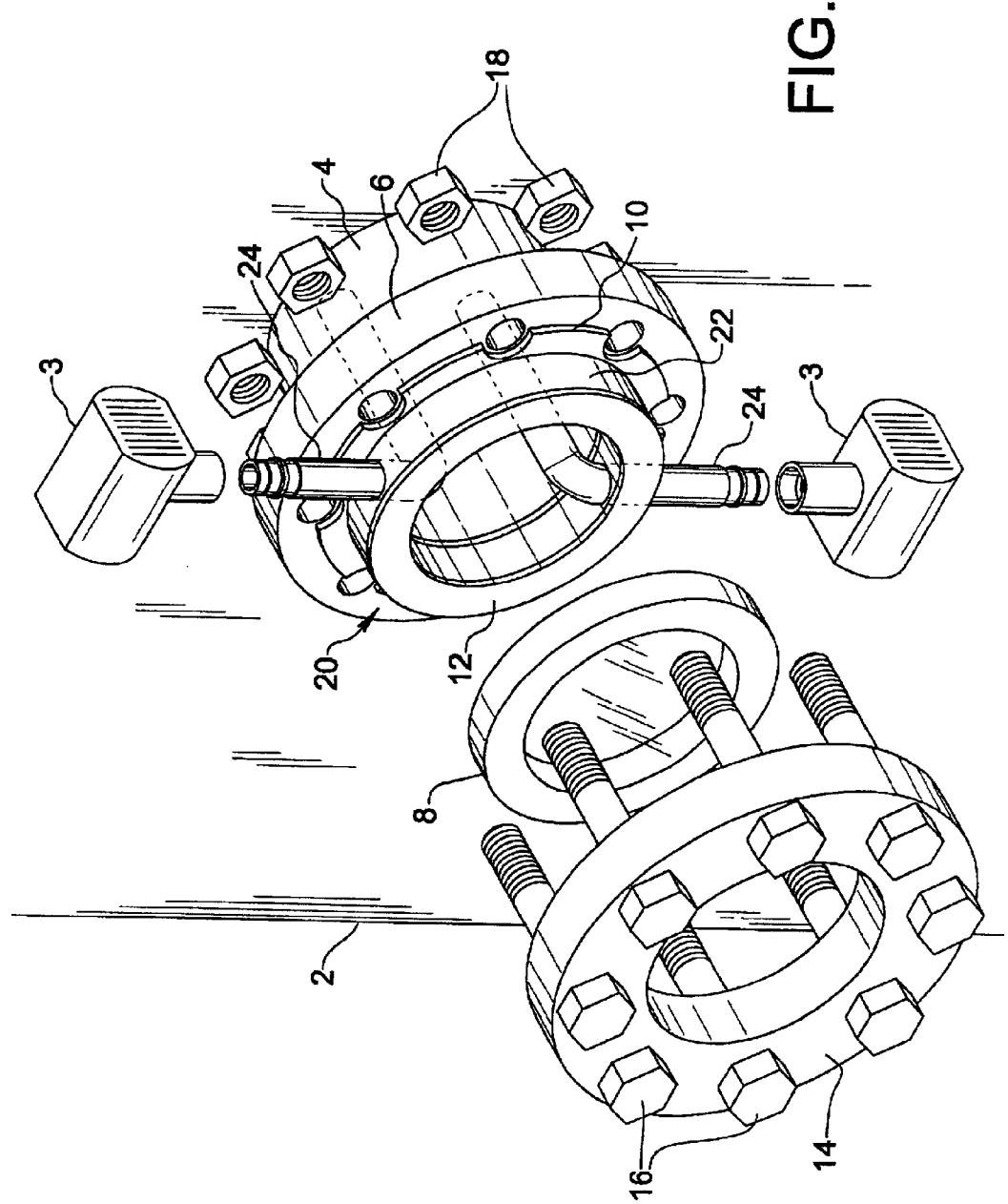
FIG. 1 is an exploded perspective view showing an illumination and viewing assembly incorporating an illumination module formed in accordance with a preferred embodiment of the present invention aligned with a sight glass.

Reference is made initially to FIG. 1 of the drawings, wherein a vessel 2 is shown as including a nozzle port 4 extending outward from a wall of the vessel. An illumination module 20 formed in accordance with the present invention is mounted between a distal flange 6 of nozzle port 4 and a sight glass 8 such that the nozzle port, illumination module and sight glass are in axial alignment with each other. Illumination module 20 delivers illuminating radiation from one or more radiation sources 3 to the internal contents of vessel 2, thereby enabling observation of a process, such as a chemical reaction, taking place within vessel 2. In a preferred mounting arrangement, a first sealing gasket 10 is located between opposed surfaces of flange 6 and illumination module 20, and a second sealing gasket 12 is located between opposed surfaces of the illumination module and sight glass 8. Illumination module 20 and sight glass 8 are clamped in place by a retainer flange 14 and a series of angularly spaced bolts 16 extending through aligned bolt holes in the retainer flange and nozzle port flange to mate with corresponding nuts 18.

It is also possible to mount illumination module 20 in combination with a "Quickport Closure Device" as shown and described in commonly-owned U.S. Pat. No. 5,141,125 issued Aug. 25, 1992, which patent is hereby incorporated in the present specification by reference. In such an arrangement, illumination module 20 can be located between a sliding door of the Quickport Closure Device and the nozzle port flange.

Figure 2:
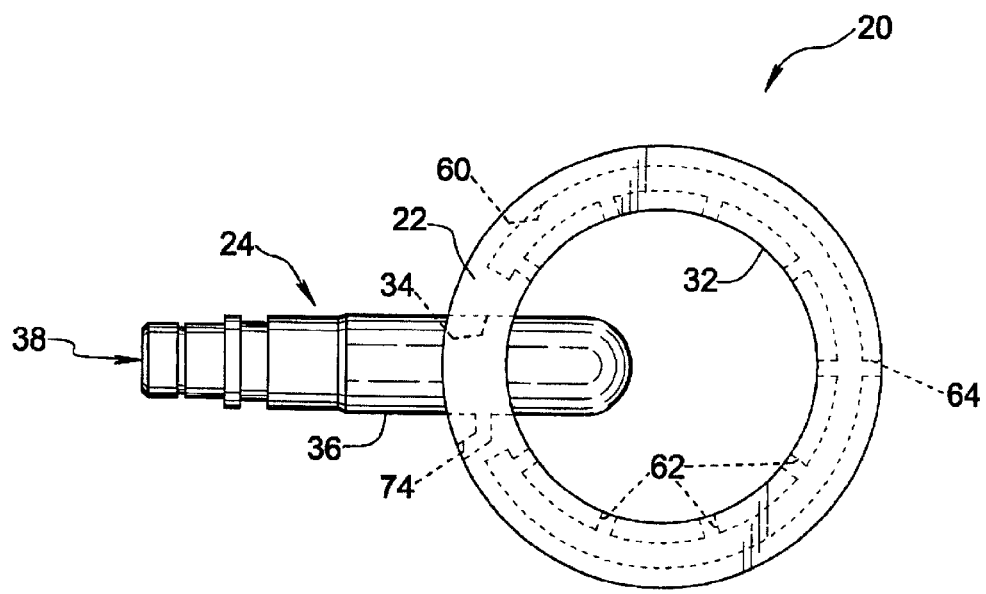
FIG. 2 is an end view of an illumination module similar to that shown in FIG. 1.
Figure 3:
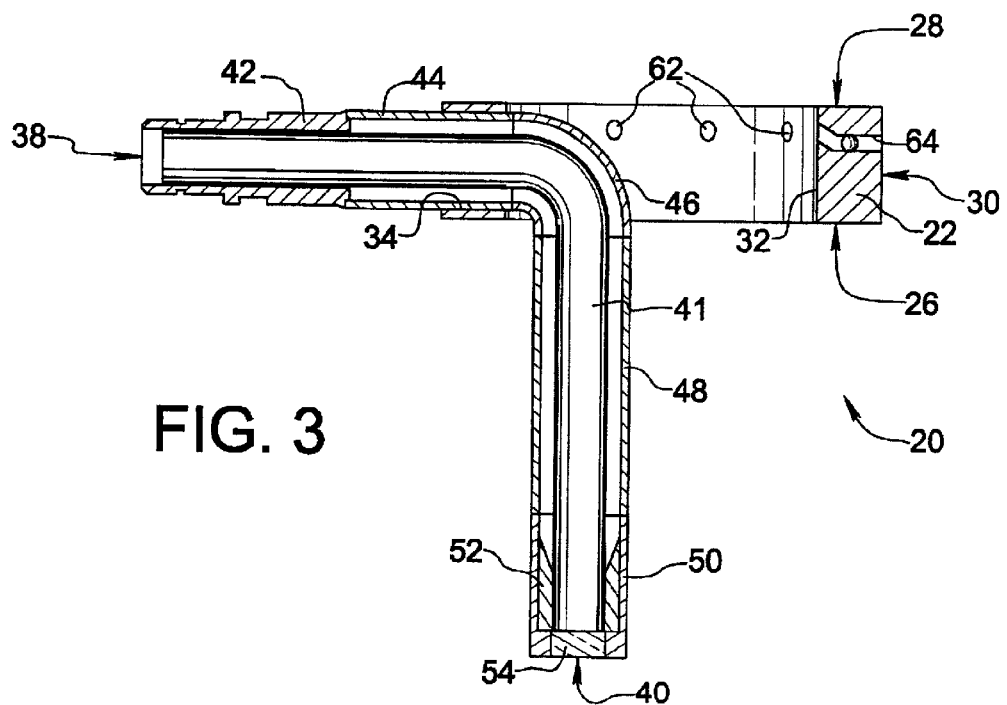
FIG. 3 is a cross-sectional view of the illumination module shown in FIG. 2.

Referring also now to FIGS. 2 and 3, it will be seen that illumination module 20 generally comprises a mounting member 22 that is preferably ring-shaped, and one or more radiation guides 24. Mounting member 22, which can be any suitable shape, includes a leading end 26 intended to be mounted proximate to nozzle port flange 6 and a trailing end 28 in sealed adjacency to sight glass 8. Leading end 26 and trailing end 28 are connected by an outer surface 30. A passage 32 extends through mounting member 22 from leading end 26 to trailing end 28, and one or more guide holes 34 extend radially through mounting member 22 from outer surface 30 to passage 32 for communication with the passage. In a preferred embodiment, mounting member 22 is cylindrical in shape, and leading end 26 and trailing end 28 are parallel planar surfaces normal to an axial direction of the mounting member so that the illumination module can be installed easily between segments of a pipeline, as will be described below.

As will be appreciated from examining FIG. 2, the cross-sectional area of passage 32 that is unblocked by radiation guide 24 is greater than the cross-sectional area of passage 32 that is blocked by radiation guide 24 to facilitate viewing through the passage. This is also a preferred condition where more than one radiation guide 24 is provided, as shown for example in FIG. 1. The radiation guide can be at any angle including the 90 degrees as shown.

Radiation guides 24 each comprise a tubular housing 36 defining a radiation entry end 38 for communication with a radiation source 3 and terminating at a radiation exit end 40. Within housing is a light pipe 41 or other suitable means for guiding source radiation. Housing 36, which is preferably stainless steel to withstand the effects of process chemicals, can be made of selected parts welded end-to-end to form a ninety-degree bend in the radiation guide path. Other materials resistant to corrosion can be used, including but not limited to HASTELLOY®, glass, TEFLON®, and the like. In the preferred embodiment described presently, housing 36 includes a light pipe fitting 42, a first extension tube 44 welded onto the light pipe fitting 42, a short radius ninety-degree elbow 46 welded to first extension tube 44, a second extension tube 48 welded to elbow 46, and a terminal fitting 50 welded to second extension 48. A centering guide 52 is welded into terminal fitting 50. A procedure for assembling radiation guide 24 and installing it in mounting member 22 includes spot welding centering guide 52 into terminal fitting 50, welding second extension tube 48 to terminal fitting 50, welding second extension tube 48 to elbow 46, welding elbow 46 to first extension tube 44, moving the resulting subassembly into passage 32 and inserting first extension tube 44 into guide hole 34 until the subassembly is as close as allowed to the inner wall of mounting member 22, welding the subassembly in place using a fillet weld between the subassembly and inner wall, and then pressing and welding light pipe fitting 42 onto first extension tube 44.

Beginning at radiation entry end 38, radiation guide 24 is arranged to extends through guide hole 34 of mounting member 22 into passage 32 and along the passage in the direction of leading end 26 until the radiation guide terminates at radiation exit end. As best seen in the enlarged view of FIG. 4, radiation exit end 40 includes a glass window 54 fused to housing 36, and more specifically to terminal fitting 50 of housing 36. Window 54 is formed of a material that transmits the particular source radiation and preferably exhibits strength and corrosion resistance. By way of example, fused glass window 54 can be made of borosilicate glass, quartz glass, acrylics, optical grade polymers, and similar transparent or translucent materials. Each fused glass window 54 is individually fused at high temperature and pressure in terminal fitting 50 to maintain a hermetic seal between the interior of vessel 2 and the interior of housing 36. The fusing process followed in the present invention is similar to that process described in *Glass Engineering Handbook, Third Edition*, Chapter 5, (1984) Library of Congress ISBN 0-07-044823-X by G. W. McLellan and E. B. Shand. Fused glass window 54 is depicted as a plano—plano lens in FIG. 4, however other lens configurations can be used depending upon the application. For example, if divergence of an illumination beam of source radiation is desired, fused glass window 54 can be a biconcave, plano-concave, or negative meniscus lens. Conversely, if convergence of an illumination beam of source radiation is desired, fused glass window 54 can be a biconvex, plano-convex, or positive meniscus lens.

Illumination module 20 preferably includes a coarse flow duct system 60 communicating with at least one spray port 62 directed at said sight glass 8, whereby fluid from a fluid source (not shown) can be delivered for cleaning the sight glass. In the embodiment shown in FIGS. 2 and 3, coarse flow duct system 60 includes a fluid entry port 64 opening radially through outer surface 30 of mounting member 22 and communicating with an internal, substantially circumferential delivery channel 66 in the mounting member. In turn, the delivery channel 66 communicates with spray ports 62 which are spaced angularly about a central axis of passage 32 and directed obliquely at the internal surface of sight glass 8.

Figure 4:
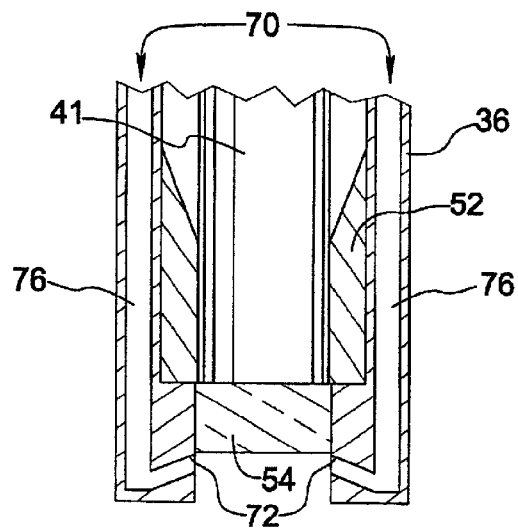
FIG. 4 is an enlarged cross-sectional view of an exit end of a radiation guide of an illumination module formed in accordance with the present invention.

Referring now to FIGS. 2 and 4, a fine flow duct system 70 is preferably provided through mounting member 22 and radiation guide housing 36 for flow communication with spray ports 72 directed at fused glass window 54, whereby fluid from a fluid source (not shown) can be delivered for cleaning the exposed surface of the fused glass window. The fine flow duct system 70 includes a fluid entry port 74 opening radially through outer surface 30 of mounting member 22 and bending to communicate with fine internal delivery channels 76 running within the walls of housing 36 to reach spray ports 72.

Figure 5:
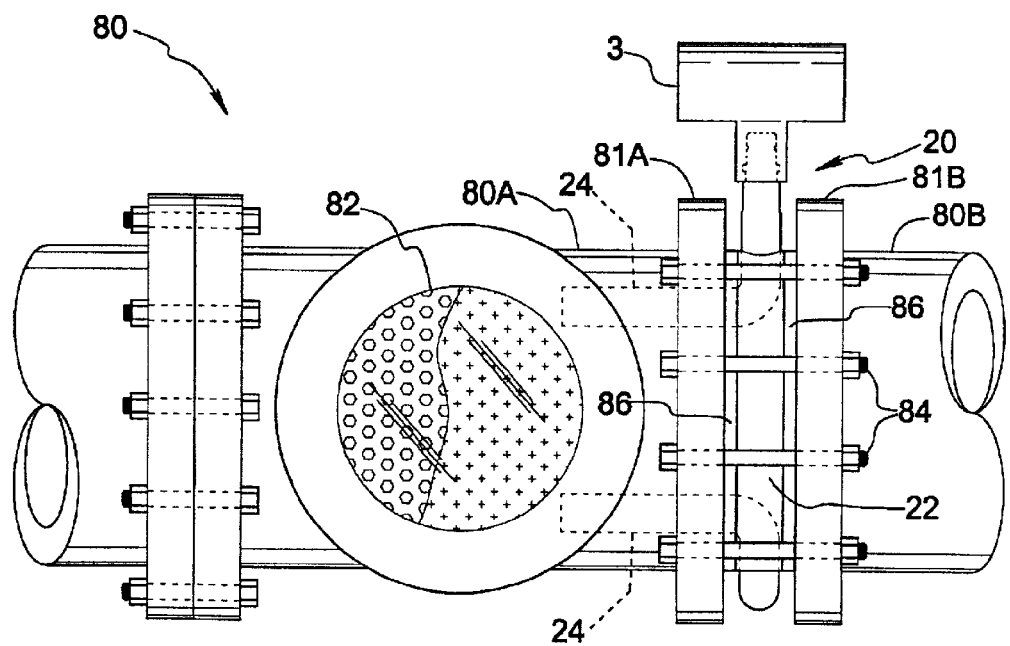
FIG. 5 is a side elevational view showing an illumination and viewing assembly incorporating an illumination module of the present invention inserted in a process pipeline for directing illuminating radiation orthogonal to a viewing axis of a viewing window in the pipeline.

As illustrated in FIG. 5, illumination module 20 of the present invention can be installed in a process pipeline 80 for directing illuminating radiation in any direction in relation to a viewing axis of an existing viewing window 82 in the pipeline, or in some other direction or angle relative to the viewing axis. The non-axial illumination is particularly useful for observing fluid—fluid and particle-fluid process interfaces. As mentioned above, the leading end 26 and trailing end 28 of mounting member 22 are parallel planar surfaces, such that pipeline segments 80A and 80B connected via mounting member 22 can remain in alignment along a straight pipeline axis. In the assembly shown, mounting member 22 is clamped between opposing end flanges 81A and 81B of pipeline segments 80A and 80B using a plurality of nut and bolt connections 84 between the end flanges, with a pair of sealing gaskets 86 being positioned between the leading end 26 of mounting member 22 and end flange 81A and between the trailing end 28 of mounting member 22 and end flange 81B, respectively. It will be realized that a camera unit or other radiation detector can be substituted for viewing window 82.

Figure 6:
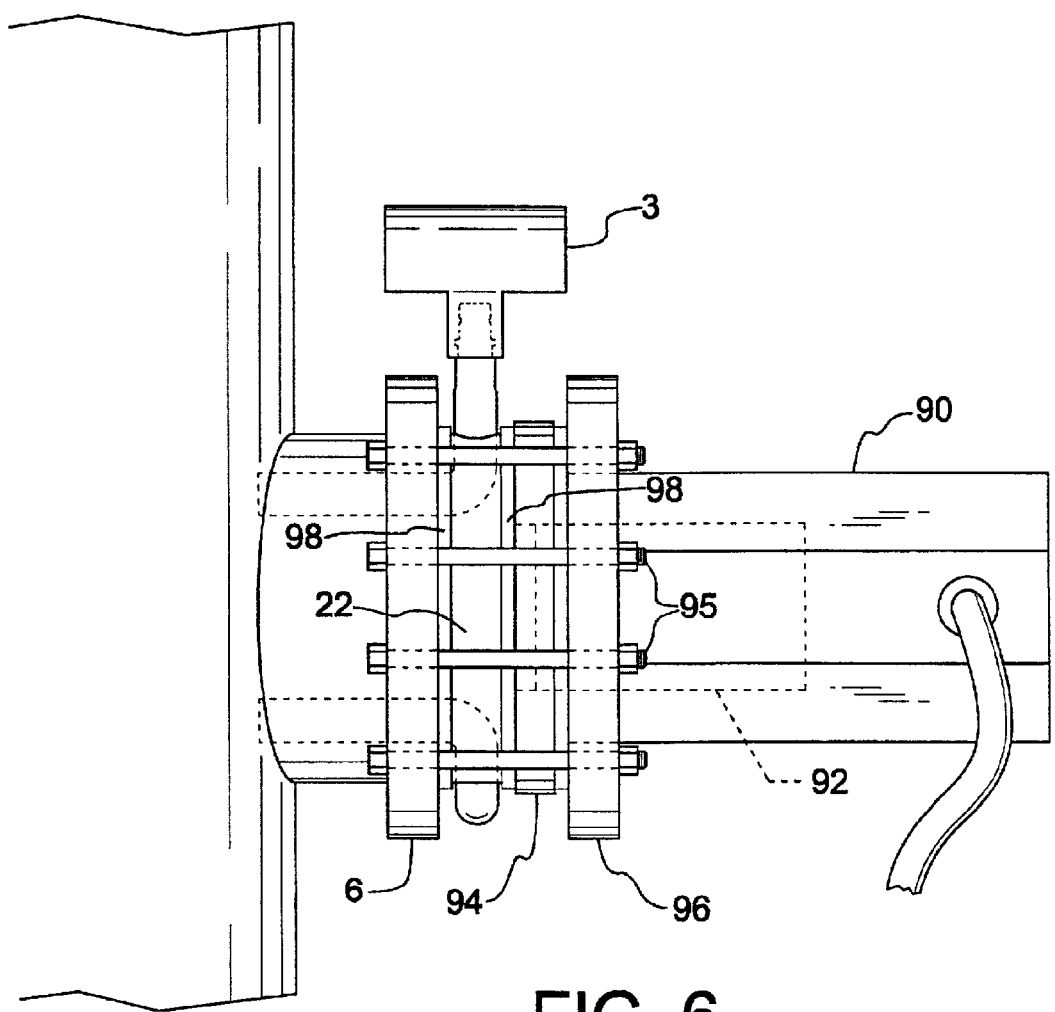
FIG. 6 is a side elevational view showing an illumination and viewing assembly incorporating an illumination module of the present invention aligned with a camera viewing unit. The camera can be oriented in an infinite number of ways.

FIG. 6 shows a further illumination and viewing assembly incorporating illumination module 20 of the present invention. The assembly comprises a radiation detector in the form of a camera unit 90 mounted adjacent to trailing end 28 of mounting member 22 such that a field of view of camera lens 92 is through an unblocked cross-sectional area of passage 32. In the assembly of FIG. 6, mounting member 22 is clamped between a nozzle flange 6 and an abutment flange 94 of camera unit 90 by a retainer flange 96 arranged about the camera unit housing and a plurality of nut and bolt connections 95 acting between the nozzle flange and the retainer flange. Sealing gaskets 98 are positioned between the leading end 26 of mounting member 22 and nozzle flange 6, and between the trailing end 28 of mounting member 22 and abutment flange 94 of camera unit 90. Camera unit 90 can be of a type described in commonly owned U.S. Pat. No. 4,977,418, which patent is hereby incorporated by reference into the present specification. Of course, alternative radiation detection units can be used, depending upon the type of illuminating radiation involved.

Those familiar with the present art will realize that there exists an infinite number of orientations at which camera unit 90, or another radiation detector, can be installed with respect to a process pipeline or vessel. Therefore, while the drawings show a substantially ninety-degree bend in radiation guides 24, other bends and additional directional shifts can be provided in a radiation guide 24 as it extends along passage 32.

While clamping means are disclosed for installing or mounting the assemblies of FIGS. 5 and 6 in a pipeline or on a vessel, it will be realized that many alternative means and configurations for installing or mounting exist, including but not limited to other flanged connections, direct threaded connections wherein mating threads are provided, TRI-CLOVER® connections, and the like.

What is claimed is:

1. An illumination module for transmitting radiation from a radiation source to the interior of a vessel, said module comprising:

a mounting member including a leading end, a trailing end, an outer surface connecting said leading and trailing ends, a passage extending through said mounting member from said leading end to said trailing end, said passage in fluid communication with the interior of the vessel, and a guide hole extending through said mounting member from said outer surface to said passage for communication with said passage; and a radiation guide having a radiation entry end for communication with said radiation source and a radiation exit end, said radiation guide being arranged to extend from said radiation entry end through said guide hole into said passage and along said passage in the direction of said leading end, said radiation guide terminating at said radiation exit end.

2. The illumination module according to claim 1, wherein the cross-sectional area of said passage that is unblocked by said radiation guide is greater that the cross-sectional area of said passage that is blocked by said radiation guide to facilitate viewing through said passage.

3. The illumination module according to claim 1, wherein there is a plurality said guide holes and a plurality of corresponding radiation guides.

4. The illumination module according to claim 3, wherein the cross-sectional area of said passage that is unblocked by said plurality of radiation guides is greater than the cross-sectional area of said passage that is blocked by said plurality of radiation guides to facilitate viewing through said passage.

5. The illumination module according to claim 1, wherein said leading end and said trailing end of said mounting member are planar surfaces parallel to one another.

6. The illumination module according to claim 1, wherein said radiation guide includes a housing, and said radiation exit end of said radiation guide includes a glass window fused to said housing.

7. The illumination module according to claim 6, wherein said mounting member and said housing include a fine flow duct system communicating with at least one spray port directed at said fused glass window, whereby fluid is delivered for cleaning said fused glass window.

8. The illumination module according to claim 1, wherein the vessel includes a process pipeline.

9. The assembly according to claim 8, wherein said mounting member and said housing include a fine flow duct system communicating with at least one spray port directed at said fused glass window, whereby fluid is delivered for cleaning said fused glass window.

10. An illumination and viewing assembly for transmitting radiation to the interior of a vessel comprising:
a mounting member including a leading end, a trailing end, an outer surface connecting said leading and trailing ends, a passage extending through said mounting member from said leading end to said trailing end, said passage in fluid communication with the interior of the vessel, and a guide hole extending through said mounting member from said outer surface to said passage for communication with said passage;
a radiation guide having a radiation entry end and a radiation exit end, said radiation guide being arranged to extend from said radiation entry through said guide hole into said passage and along said passage in the direction of said leading end, said radiation guide terminating at said radiation exit end;
a radiation source connected to said radiation entry end; and
a sight glass in sealed adjacency to said trailing end of said mounting member and in alignment with said passage.

11. The assembly according to claim 10, wherein the cross-sectional area of said sight glass that is unblocked by said radiation guide is greater than the cross-sectional area of said sight glass that is blocked by said radiation guide to facilitate viewing through said sight glass.

12. The assembly according to claim 10, wherein there is a plurality of said guide holes and plurality of corresponding radiation guides.

13. The assembly according to claim 12, wherein the cross-sectional area of sight glass that is unblocked by said plurality of radiation guides is greater than the cross-sectional area of said light that is blocked by said plurality of radiation guides to facilitate viewing through said sight glass.

14. The assembly according to claim 10, wherein said leading end and said trailing end of said mounting member are planar surfaces parallel to one another.

15. The assembly according to claim 10, wherein said sight glass is clamped toward said trailing surface of said mounting member.

16. The assembly according to claim 10, wherein said mounting member includes a coarse flow duct system communicating with at least one spray port directed at said sight glass, whereby fluid is delivered for cleaning said sight glass.

17. The assembly according to claim 10, wherein said radiation guide includes a housing, and said exit end of said radiation guide includes a glass window fused to said housing.

18. The assembly according to claim 17, wherein said mounting member and said housing include a fine flow duct system communicating with at least one spray port directed at said fused glass window, whereby fluid is delivered for cleaning said fused glass window.

19. The illumination module according to claim 10, wherein the vessel includes a process pipeline.

20. An illumination and viewing assembly for transmitting radiation to the interior of a vessel comprising:
a mounting member including a leading end, a trailing end, an outer surface connecting said leading and trailing ends, a passage extending through said mounting member from said leading end to trailing end, said passage in fluid communication with the interior of the vessel, and a guide hole extending through said mounting member from said outer surface to said passage for communication with said passage;
a radiation guide having a radiation entry end and a radiation exit end, said radiation guide being arranged to extend from said radiation entry end through said guide hole into said passage and along said passage in the direction of said leading end, said radiation guide terminating at said radiation exit end;
a radiation source connected to said radiation entry end; and
a radiation detection unit in sealed adjacency to said trailing end of said mounting member, said radiation detection unit having a field of view through a cross-sectional area of said passage that is unblocked by said radiation guide.

21. The assembly according to claim 20, wherein there is a plurality of said guide holes and a plurality of corresponding radiation guides.

22. The assembly according to claim 20, wherein said leading end and said trailing end of said mounting member are planar surfaces parallel with one another.

23. The assembly according to claim 20, wherein said radiation detection unit is clamped toward said trailing end of said mounting member.

24. The assembly according to claim 20, wherein said mounting member includes a coarse flow duct system communicating through said mounting member to at least one spray port directed at a lens of said radiation detection unit, whereby fluid is delivered for cleaning said lens.

25. The assembly according to claim 20, wherein said radiation guide includes a housing, and said radiation exit end of said radiation guide includes a glass window fused to said housing.

26. The illumination module according to claim 20, wherein the vessel includes a process pipeline.

* * * * *